(Model.)
J. E. DONOVAN.
Vapor Burner.
No. 235,673.  Patented Dec. 21, 1880.
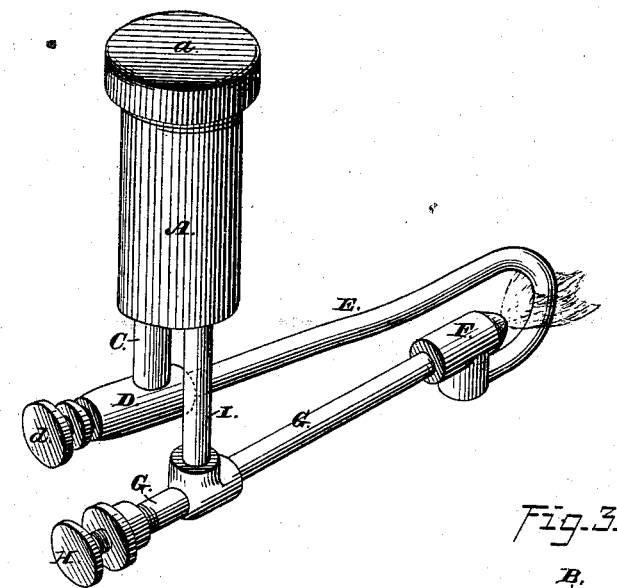
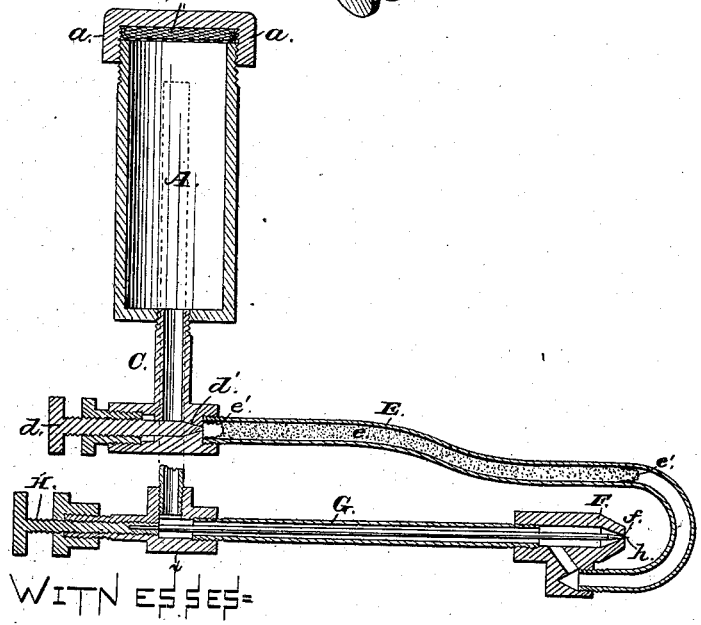
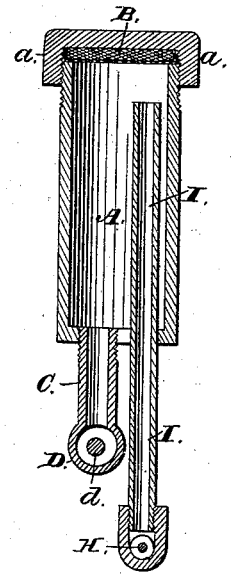
WITNESSES:
Jas. E. Hutchinson,
Henry C. Hazard.
INVENTOR:
Jno. E. Donovan, by
Geo. S. Prindle, his Atty.

UNITED STATES PATENT OFFICE.

JOHN E. DONOVAN, OF CINCINNATI, OHIO.

VAPOR-BURNER.

SPECIFICATION forming part of Letters Patent No. 235,673, dated December 21, 1880.

Application filed July 19, 1880. (Model.)

*To all whom it may concern:*

Be it known that I, JOHN E. DONOVAN, of Cincinnati, in the county of Hamilton, and in the State of Ohio, have invented certain new and useful Improvements in Vapor-Burners; and I do hereby declare that the following is a full, clear, and exact description thereof, reference being had to the accompanying drawings, making a part of this specification, in which—

Figure 1 is a perspective view of my apparatus separate from its supporting attachments. Fig. 2 is a central longitudinal section of the same, and Fig. 3 is a section of the reservoir upon line $x$ $x$ of Fig. 2.

Letters of like name and kind refer to like parts in each of the figures.

This invention relates to the smaller and more simple devices for vaporizing and burning inflammable liquids, and its object is to equalize the pressure within such apparatus, so as to prevent back-pressure at the vaporizing-point, and so as to aid the flow by pressure upon the liquid within its reservoir when the unaided action of gravity upon the liquid becomes insufficient, without multiplying parts.

To this end my invention consists, principally, in the combination of a generating-tube entering the body of the burner proper from the front, and a simple system of equalizing-tubes connecting the rear end of said burner with the space above the liquid in the reservoir, so as to prevent back-pressure, as aforesaid, the lower of said equalizing-tubes serving also to inclose the stem of a needle-valve, for opening and closing the burner in the most approved manner.

My invention consists, further, in a regulating-valve interposed between said generating-tube and a supply-tube, in combination with the said supply-tube, generating-tube, burner, equalizing-tubes, and reservoir, for causing a pressure of vapor at will on the liquid within the reservoir to increase its flow.

It consists, finally, in a simple and compact apparatus composed of the parts aforesaid, constructed, arranged, and operating as hereinafter set forth.

In the annexed drawings, A represents a reservoir for containing the liquid to be vaporized, the upper end of which reservoir is preferably inclosed by means of a screw-cap, $a$, beneath which is placed an elastic packing-gasket, B.

From the lower end of the reservoir A a pipe, C, extends to and is connected with a valve-box, D, that at one end has a packed opening for the reception of a threaded valve-stem, $d$, the pointed end of which latter impinges upon and corresponds to a valve-seat, $d'$, that is provided within the opposite end of said valve-box, the arrangement being such as to enable the opening in and through said valve-seat to be partially or entirely closed by the rotation of said valve-stem.

Secured to the valve-closed end of the box D is a tube, E, which from thence extends horizontally outward a certain distance, and thence in a curve downward and rearward, and at its rear end is connected with the lower side of a burner, F, which burner has its orifice $f$ arranged to throw a flame horizontally against the said curved portion of said tube E.

From the rear end of the burner F a tube, G, extends rearward to a point upon a line with the valve-box D, and at its rear end is provided with a packed opening, through which passes a threaded rod, H, that extends into said burner and has a pointed end, $h$, which, by the rotation of said rod, may be caused to partly or entirely close the orifice $f$.

From a point near the reservoir A a tube, I, extends from the tube G to and communicates with the upper portion of said reservoir.

The reservoir A is intended to contain a supply of fluid for vaporization, which fluid is admitted to the tube E by means of the valve $d$, and from thence passes forward and downward until it comes into contact with the curved portion of said tube, which, being heated by the flame from the burner F, causes said fluid to become vaporized, and in such state to pass to and out of said burner, the surplus vapor being freely admitted to said reservoir through the tubes G and I. By means of the arrangement shown the pressure within the tube E and the reservoir A is equalized, and no tendency exists to a back-pressure within said tube, so that the downward flow of the liquid to be vaporized is not interfered with in the slightest degree.

In order that the flow of the liquid for vaporization may be constant, that portion of the tube E between its curved part and the valve-box D is filled with sand e, and the same held in place by means of wire thimbles e', one of which is placed at each end of said filling.

In case that but slight elevation of the reservoir A above the burner F is practicable, the flow of liquid to the latter may be caused by pressure within said reservoir, to accomplish which it is only necessary that more liquid should be vaporized than is necessary for supplying said burner. This is accomplished by increasing the supply of liquid to the generating-tube by means of the valve d d', and the same expedient may be resorted to to advantage as the level of the liquid in the reservoir falls during the continued operation of the apparatus, in order to compensate for loss of weight.

Having thus fully set forth the nature and merits of my invention, what I claim as new is—

1. In an apparatus for vaporizing inflammable liquids, the combination, with a suitable burner, of a generating-tube connected with the body of said burner from in front thereof, and a system of equalizing-tubes connecting the rear end of said burner with the upper part of the reservoir, the lower one of said equalizing-tubes serving, additionally, to inclose the stem of a needle-valve, substantially as herein specified.

2. In an apparatus for vaporizing inflammable liquids, the combination of a reservoir, A, supply-tube C, a valve-box, D, with its valve d d', a generating-tube, E, a burner, F f, arranged to throw a flame against said generating-tube, to which it is connected, and a system of equalizing-tubes, G I, connecting the rear end of said burner with the upper part of the reservoir, substantially as herein described, for the purpose set forth.

3. The combination of the reservoir A, tubes C E G I, burner F f, valve-box D, and valves d d' and H h, constructed and arranged as shown, for vaporizing inflammable liquids and equalizing the pressure within the apparatus, in the manner herein set forth.

In testimony that I claim the foregoing I have hereunto set my hand this 3d day of July, 1880.

JOHN E. DONOVAN.

Witnesses:
SAM C. TATUM, Jr.,
SAML. E. HILLES.